United States Patent
Fei et al.

(10) Patent No.: US 11,977,894 B2
(45) Date of Patent: May 7, 2024

(54) METHOD AND SYSTEM FOR DISTRIBUTING INSTRUCTIONS IN RECONFIGURABLE PROCESSOR AND STORAGE MEDIUM

(71) Applicant: Beijing Tsingmicro Intelligent Technology Co., Ltd., Beijing (CN)

(72) Inventors: Baochuan Fei, Beijing (CN); Peng Ouyang, Beijing (CN); Shibin Tang, Beijing (CN); Liwei Deng, Beijing (CN)

(73) Assignee: BEIJING TSINGMICRO INTELLIGENT TECHNOLOGY CO., LTD., Beijing (CN)

( * ) Notice: Subject to any disclaimer, the term of this patent is extended or adjusted under 35 U.S.C. 154(b) by 141 days.

(21) Appl. No.: 17/770,553

(22) PCT Filed: May 7, 2021

(86) PCT No.: PCT/CN2021/092239
§ 371 (c)(1),
(2) Date: Apr. 20, 2022

(87) PCT Pub. No.: WO2022/134426
PCT Pub. Date: Jun. 30, 2022

(65) Prior Publication Data
US 2023/0068463 A1     Mar. 2, 2023

(30) Foreign Application Priority Data
Dec. 23, 2020   (CN) .......................... 202011539672.1

(51) Int. Cl.
*G06F 9/38*    (2018.01)
*G06F 15/78*   (2006.01)

(52) U.S. Cl.
CPC .......... *G06F 9/3836* (2013.01); *G06F 9/3802* (2013.01); *G06F 9/3838* (2013.01); *G06F 15/7867* (2013.01)

(58) Field of Classification Search
CPC .... G06F 9/3838; G06F 9/3836; G06F 9/3802; G06F 9/4881
See application file for complete search history.

(56) References Cited

U.S. PATENT DOCUMENTS

| 6,016,540 | A  | * | 1/2000  | Zaidi ........................ G06F 9/384 712/216 |
| 2014/0181476 | A1 | * | 6/2014  | Srinivasan ............ G06F 9/3838 712/208 |
| 2019/0377599 | A1 | * | 12/2019 | Abhishek Raja ..... G06F 9/3887 |

* cited by examiner

*Primary Examiner* — Courtney P Spann
(74) *Attorney, Agent, or Firm* — Hodgson Russ LLP

(57) ABSTRACT

The disclosure provides a method for distributing instructions in a reconfigurable processor. The reconfigurable processor includes an instruction fetch module, an instruction sync control module and an instruction queue module. The method includes: configuring a format of a Memory Sync ID Table of each instruction type, obtaining a first memory identification field and a second memory identification field of each instruction, obtaining one-hot encodings of first and second memory identification fields, obtaining a sync table and executing each instruction of a plurality of to-be-run instructions.

10 Claims, 5 Drawing Sheets

METHOD AND SYSTEM FOR DISTRIBUTING INSTRUCTIONS IN RECONFIGURABLE PROCESSOR AND STORAGE MEDIUM

CROSS-REFERENCE TO RELATED APPLICATION

This disclosure is a national phase entry of International Application No. PCT/CN2021/092239 filed on May 7, 2021, which is based upon and claims priority to Chinese Patent Application No. 2020115396721 filed on Dec. 23, 2020, the entire contents of which are incorporated herein by reference.

TECHNICAL FIELD

The disclosure relates to the field of reconfigurable processors, and more particularly, to a method for distributing instructions in a reconfigurable processor, a system for distributing instructions in a reconfigurable processor and a storage medium.

BACKGROUND

Instructions in the reconfigurable processor may include different types of instructions such as loading read direct memory access (RDMA) data, computing (EXEC) and storing write direct memory access (WDMA) data during the development and application process of the reconfigurable processor. Due to a limitation of computing units of the reconfigurable processor, it may lead to low efficiency if each instruction is executed in sequence. Instructions may also be classified. If the instructions are classified into three types, three types of instructions are executed in parallel, which may effectively improve efficiency. However, due to dependency relationships among instructions, for example, data may need to be loaded first before computation, execution efficiency may not be guaranteed in parallel execution.

SUMMARY

The disclosure aims to provide a method for distributing instructions in a reconfigurable processor. In the method, a memory identification field of each instruction is extracted, one-hot encoding is performed on the memory identification field and then a Memory Sync ID Table is generated. A sync table is generated based on the Memory Sync ID Table to establish dependency relationships among instructions. Each instruction is executed in sequence based on the sync table to ensure multi-instruction parallel execution efficiency, reduce memory conflicts and shorten instruction a running duration.

The disclosure also aims to provide a system for distributing instructions in a reconfigurable processor. In the system, a memory identification field of each instruction is extracted, one-hot encoding is performed on the memory identification field and then a Memory Sync ID Table is generated. A sync table is generated based on the Memory Sync ID Table to establish dependency relationships among instructions. Each instruction is executed in sequence based on the sync table to ensure multi-instruction parallel execution efficiency, reduce memory conflicts and shorten instruction a running duration.

According to a first aspect of the disclosure, a method for distributing instructions in a reconfigurable processor is provided. The reconfigurable processor includes an instruction fetch module, an instruction sync control module and an instruction queue module; the instruction fetch module is configured to distribute a plurality of to-be-run instructions to the instruction sync control module and the instruction queue module; the instruction sync control module is configured to control execution of instructions in the instruction queue module; the instruction queue module includes a plurality of instruction queues; each instruction queue is provided with a plurality of instruction units sequentially arranged; each instruction queue corresponds to one instruction type. The method includes: step S101, configuring a format of a Memory Sync ID Table of each instruction type; the Memory Sync ID Table including a plurality of storage units sequentially configured; a first memory identification field storage bit and/or a second memory identification field storage bit being configured in each storage unit; each instruction type corresponding to a set number of first memory identification fields and/or second memory identification fields; step S102, sequentially extracting a first memory identification field and a second memory identification field of each instruction in the plurality of to-be-run instructions; step S103, obtaining one-hot encoding of the first memory identification field and/or one-hot encoding of the second memory identification field of each instruction; storing the one-hot encoding of the first memory identification field and the one-hot encoding of the second memory identification field of each instruction in the corresponding Memory Sync ID Table based on an execution order of the plurality of to-be-run instructions; sending an instruction parameter of each instruction to each instruction unit of the corresponding instruction queue in the instruction queue module; step S104, obtaining, by the instruction sync control module, dependency identification information of any one instruction type and other two instruction types based on one-hot encoding of first memory identification fields and one-hot encoding of second memory identification fields of each instruction type in the Memory Sync ID Table; generating a sync table along a first data dimension based on the dependency identification information; the sync table including a first data dimension and a second data dimension converged with each other; the first data dimension of each instruction type corresponding to a storage bit number of the Memory Sync ID Table of each instruction type; step S105, executing a corresponding instruction based on dependency of each type of instructions along the second data dimension of the sync table; a number of the second data dimension of each instruction type corresponding to a number of instruction units in the instruction queue; and calling the instruction parameter, by the instruction sync control module, corresponding to each instruction in the instruction unit through the sync table while executing the corresponding instruction to execute each instruction in the plurality of to-be-run instructions.

In embodiments of the disclosure, the instruction type includes a loading instruction, a computing instruction and a storage instruction; the Memory Sync ID Table includes a Memory Sync ID Table of loading instructions, a Memory Sync ID Table of computing instructions and a Memory Sync ID Table of storage instructions; and the instruction queue includes a loading instruction queue corresponding to loading instructions, a computing instruction queue corresponding to computing instructions and a storage instruction queue corresponding to storage instructions.

In embodiments of the disclosure, the Memory Sync ID Table includes 8 storage units sequentially configured; and the instruction queue includes 8 instruction units.

In embodiments of the disclosure, each storage unit of the Memory Sync ID Table of loading instructions includes a first memory identification field and a second memory identification field; each storage unit of the Memory Sync ID Table of computing instructions includes a first memory identification field and a second memory identification field; and each storage unit of the Memory Sync ID Table of storage instructions includes a second memory identification field.

In embodiments of the disclosure, the step S103 further includes: judging whether each instruction unit of the instruction queue is full or not; if yes, returning to the step until there is an idle instruction unit in the instruction queue; if no, executing step S104.

According to a second aspect of the disclosure, a system for distributing instructions in a reconfigurable processor is provided. The reconfigurable processor includes an instruction fetch module, an instruction sync control module and an instruction queue module; the instruction fetch module is configured to distribute a plurality of to-be-run instructions to the instruction sync control module and the instruction queue module; the instruction sync control module is configured to control execution of instructions in the instruction queue module; the instruction queue module includes a plurality of instruction queues; each instruction queue is provided with a plurality of instruction units sequentially arranged; each instruction queue corresponds to one instruction type.

The system includes the following units.

A Memory Sync ID Table configuring unit, is configured to configure a format of a Memory Sync ID Table of each instruction type; the Memory Sync ID Table including a plurality of storage units sequentially configured; a first memory identification field storage bit and/or a second memory identification field storage bit being configured in each storage unit; each instruction type corresponding to a set number of first memory identification fields and/or second memory identification fields.

An instruction fetch unit, is configured to sequentially extract a first memory identification field and a second memory identification field of each instruction in the plurality of to-be-run instructions.

A one-hot encoding unit, is configured to obtain one-hot encoding of the first memory identification field and/or one-hot encoding of the second memory identification field of each instruction; store the one-hot encoding of the first memory identification field and the one-hot encoding of the second memory identification field of each instruction in the corresponding Memory Sync ID Table based on an execution order of the plurality of to-be-run instructions; and send an instruction parameter of each instruction to each instruction unit of the corresponding instruction queue in the instruction queue module.

A sync table generating unit, is configured to obtain, by the instruction sync control module, dependency identification information of any one instruction type and other two instruction types based on one-hot encoding of first memory identification fields and one-hot encoding of second memory identification fields of each instruction type in the Memory Sync ID Table; and generate a sync table along a first data dimension based on the dependency identification information; the sync table including a first data dimension and a second data dimension converged with each other; the first data dimension of each instruction type corresponding to a storage bit number of the Memory Sync ID Table of each instruction type.

An instruction execution unit, is configured to execute a corresponding instruction based on dependency of each type of instructions along the second data dimension of the sync table; a number of the second data dimension of each instruction type corresponding to a number of instruction units in the instruction queue; and call, by the instruction sync control module, the instruction parameter corresponding to each instruction in the instruction unit through the sync table while executing the corresponding instruction to execute each instruction in the plurality of to-be-run instructions.

In embodiments of the disclosure, the instruction type includes a loading instruction, a computing instruction and a storage instruction; the Memory Sync ID Table includes a Memory Sync ID Table of loading instructions, a Memory Sync ID Table of computing instructions and a Memory Sync ID Table of storage instructions; and the instruction queue includes a loading instruction queue corresponding to loading instructions, a computing instruction queue corresponding to computing instructions and a storage instruction queue corresponding to storage instructions.

In embodiments of the disclosure, the Memory Sync ID Table includes 8 storage units sequentially configured; and the instruction queue includes 8 instruction units.

In embodiments of the disclosure, each storage unit of the Memory Sync ID Table of loading instructions includes a first memory identification field and a second memory identification field; each storage unit of the Memory Sync ID Table of computing instructions includes a first memory identification field and a second memory identification field; and each storage unit of the Memory Sync ID Table of storage instructions includes a second memory identification field.

In embodiments of the disclosure, the one-hot encoding unit is further configured to judge whether each instruction unit of the instruction queue is full or not; if yes, return to the one-hot encoding unit until there is an idle instruction unit in the instruction queue; if no, execute the sync table generating unit.

Characteristics, technical features, advantages and implementations of the method and the system for distributing instructions in the reconfigurable processor are further described below in combination with the accompanying drawings in a clear and easy-to-understand manner.

DETAILED DESCRIPTION

Figure 1:
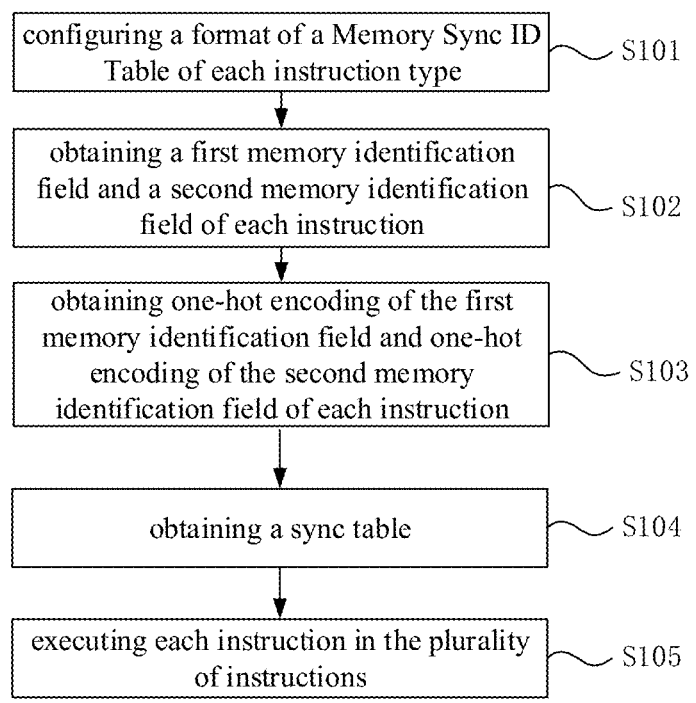
FIG. 1 is a flowchart illustrating a method for distributing instructions in a reconfigurable processor in some embodiments of the disclosure.

To understand technical features, purposes and effects of the disclosure more clearly, embodiments of the disclosure are described with reference to the drawings. The components with the same structure and the same function or the components with the similar structure and the same function are denoted by the same reference numerals in each figure.

In the disclosure, "schematic" means "serving as an example, instance, or illustration" and any figures and implementations described as "schematic" herein in any way shall not be described as more preferred or more advantageous technical solutions. To make the figures concise, only a portion relevant to the exemplary embodiments may be illustrated schematically in each figure and not be intended to represent actual structures and substantial proportions of the products.

Figure 5:
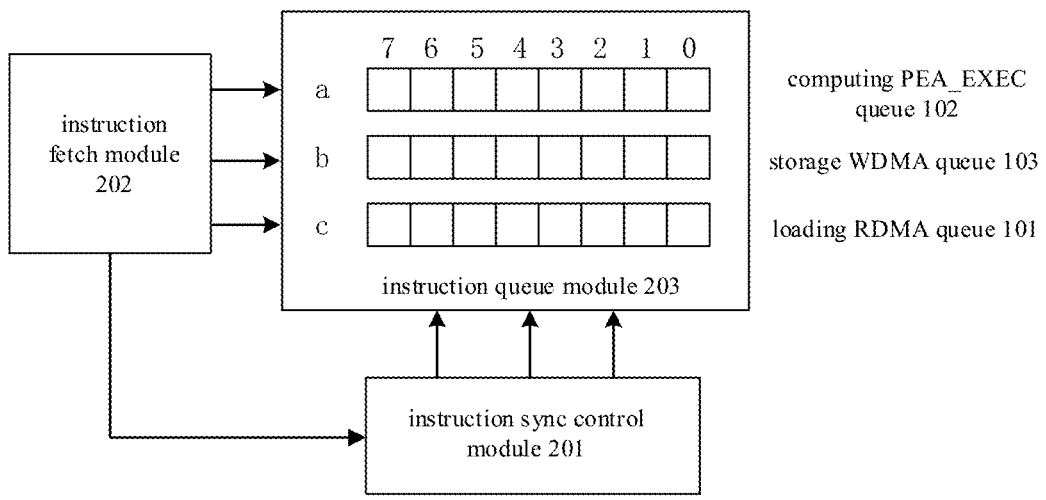
FIG. 5 is a schematic diagram illustrating a reconfigurable processor in some embodiments of the disclosure.

FIG. 5 is a schematic diagram illustrating a reconfigurable processor in some embodiments of the disclosure. As illustrated in FIG. 5, the reconfigurable processor includes an instruction fetch module 202, an instruction sync control module 201 and an instruction queue module 203.

The instruction fetch module 202 may split a plurality of to-be-run instructions and distribute them to the instruction sync control module 201 and the instruction queue module 203 respectively.

The instruction sync control module 201 controls execution of instructions in the instruction queue module. Types of to-be-run instructions are included in an instruction set. The instruction set includes a plurality of instruction types.

Figure 4:
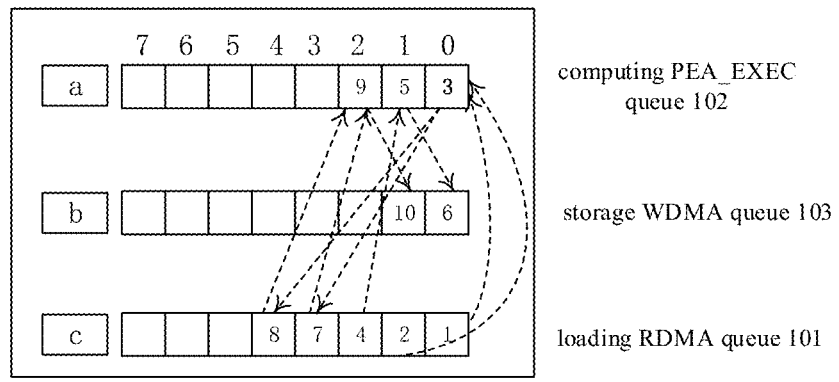
FIG. 4 is a schematic diagram illustrating a structure of an instruction queue in some embodiments of the disclosure.

FIG. 4 is a schematic diagram illustrating a structure of an instruction queue in some embodiments of the disclosure. As illustrated in FIG. 4, a plurality of instruction queues are configured in the instruction queue module. For example, a computing PEA_EXEC queue 102, a storage WDMA queue 103 and a loading RDMA queue 101. 8 instruction units are sequentially arranged and configured in each of the computing PEA_EXEC queue 102, the storage WDMA queue 103 and the loading RDMA queue 101. One instruction queue corresponds to one instruction type.

According to a first aspect of the disclosure, a method for distributing instructions in a reconfigurable processor is provided. FIG. 1 is a flowchart illustrating a method for distributing instructions in a reconfigurable processor in some embodiments of the disclosure. As illustrated in FIG. 1, the method for distributing instructions in the reconfigurable processor includes the following.

At step S101, a format of a Memory Sync ID Table of each instruction type is configured.

Figure 2:
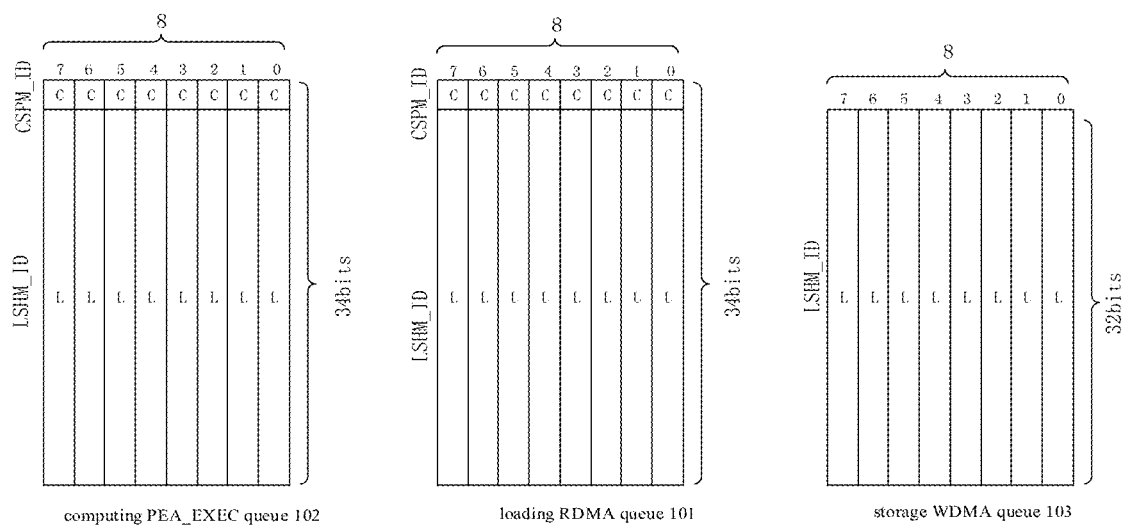
FIG. 2 is a schematic diagram illustrating a format of a Memory Sync ID Table in some embodiments of the disclosure.

At this step, as illustrated in FIG. 2, the format of the Memory Sync ID Table of each instruction type is configured. The Memory Sync ID Table includes a plurality of storage units sequentially configured and arranged. Each storage unit is configured with a first memory identification field CSPM_ID storage bit and/or a second memory identification field LSHM_ID storage bit. Each instruction type corresponds to a set number of first memory identification fields and/or second memory identification fields.

As illustrated in FIG. 2, there are 8 units in the Memory Sync ID Table of loading RDMA instructions. Each unit includes a first memory identification field CSPM_ID and a second memory identification field LSHM_ID. There are 8 units in the Memory Sync ID Table of computing PEA_EXEC instructions. Each unit includes a first memory identification field CSPM_ID and a second memory identification field LSHM_ID. There are 8 units in the Memory Sync ID Table of storage WDMA instructions. Each unit includes a second memory identification field LSHM_ID.

At step S102, a first memory identification field and a second memory identification field of each instruction are obtained.

At this step, the first memory identification field and/or the second memory identification field of each instruction in the plurality of to-be-run instructions are sequentially extracted. The instruction type of each instruction may be included in the instruction set.

For example, the following current program 1 includes:
(1) RDMA context.
(2) RDMA data.
(3) PEA_EXEC.
(4) RDMA context.
(5) PEA_EXEC.
(6) WDMA data.
(7) RDMA context.
(8) RDMA data.
(9) PEA_EXEC.
(10) WDMA data.

"RDMA data loading instruction", "PEA_EXEC computing instruction" and "WDMA data storage instruction" in 10 instructions of the above program 1 are sequentially read. The first memory identification field CSPM_ID and/or the second memory identification field LSHM_ID of "RDMA data loading instruction", "PEA_EXEC computing instruction" and "WDMA data storage instruction" are obtained.

The corresponding relationship between the number of the first memory identification fields CSPM_ID and the second memory identification fields LSHM_ID called by "RDMA data loading instruction", "PEA_EXEC computing instruction" and "WDMA data storage instruction" are illustrated in Table 1 as below.

TABLE 1

| | CSPM_ID | LSHM_ID |
|---|---|---|
| PEA_EXEC | 1 | 2 |
| WDMA | 0 | 1 |
| RDMA | 0 or 1 | 0 or 1 |

At step S103, one-hot encoding of the first memory identification field and one-hot encoding of the second memory identification field of each instruction are obtained.

At this step, the one-hot encoding of the first memory identification field and/or the one-hot encoding of the second memory identification field are obtained based on the first memory identification field and/or the second memory identification field corresponding to the instruction type of each instruction.

The one-hot encoding of the first memory identification field and the one-hot encoding of the second memory identification field of each instruction are stored in the Memory Sync ID Table based on an execution order of the plurality of to-be-run instructions.

Other instruction parameters of each instruction are sent to each instruction unit of the corresponding instruction queue in the instruction queue module.

For example, one-hot encoding of a CSPM_ID field and one-hot encoding of an LSHM_ID field of "RDMA data loading instruction" in the program 1 are stored in the Memory Sync ID Table and other instruction parameters of "RDMA data loading instruction" are stored in the instruction unit of the corresponding instruction queue.

Examples of first memory library number CSPM_ID encoding and second memory library number LSHM_ID encoding of each instruction are as follow.
(1) RDMA context, CSPM_ID=0
(2) RDMA data, LSHM_ID=0

(3) PEA_EXEC CSPM_ID=0, LSHM_ID=0, LSHM_ID=1
(4) RDMA context, CSPM_ID=1
(5) PEA_EXEC CSPM_ID=1, LSHM_ID=1, LSHM_ID=2
(6) WDMA data, LSHM_ID=2
(7) RDMA context, CSPM_ID=0
(8) RDMA data, LSHM_ID=0
(9) PEA_EXEC CSPM_ID=0, LSHM_ID=0, LSHM_ID=1
(10) WDMA data, LSHM_ID=1

At step S104, a sync table is obtained.

At this step, the instruction sync control module obtains dependency identification information of any one instruction type and other two instruction types based on one-hot encoding of first memory identification fields and one-hot encoding of second memory identification fields of each instruction type in the Memory Sync ID Table. A sync table is generated along a first data dimension based on the dependency identification information. The sync table includes a first data dimension and a second data dimension converged with each other. The first data dimension of each instruction type corresponds to a storage bit number of the Memory Sync ID Table of each instruction type.

Figure 3:
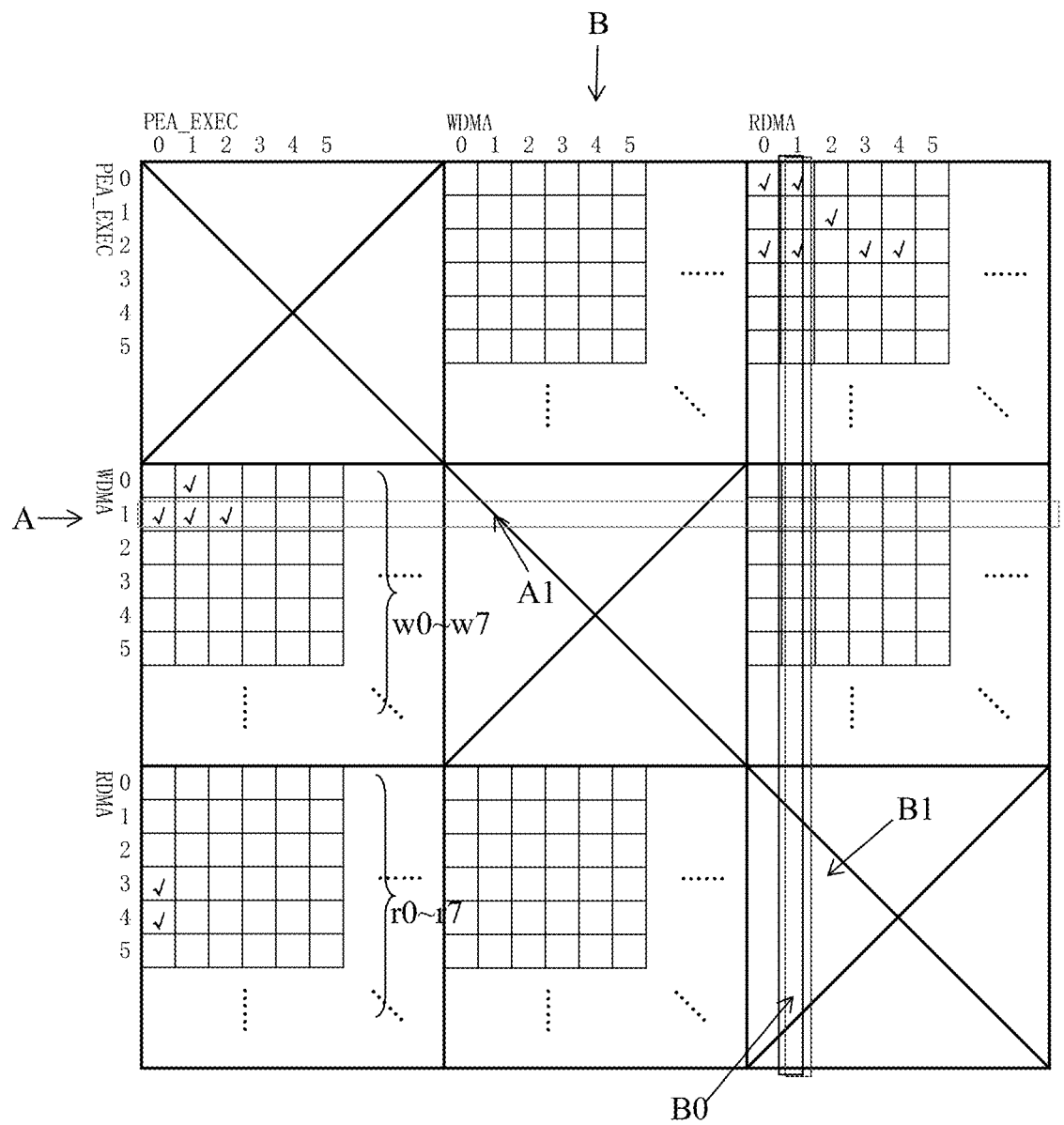
FIG. 3 is a schematic diagram illustrating a sync table in some embodiments of the disclosure.

As illustrated in FIG. 3, the first data dimension is a direction referred to by "A". The second data dimension is a direction referred to by "B".

After the one-hot encoding of the PEA_EXEC computing instruction is compared with the one-hot encoding of the WDMA data storage instruction and the one-hot encoding of the RDMA data loading instruction respectively, dependency identification information is identified in Table 3 from the direction of the first data dimension "A". For example, "√" in the row A1 of Table 3 represents a corresponding dependency of a first bit of the WDMA data storage instruction and the PEA_EXEC computing instruction. A dependency of one instruction and another two instructions is stored based on the instructions.

For example, one-hot encodings of CSPM_ID and LSHM_ID information of the current instruction are compared with the Memory Sync ID Tables of the remaining two queues not belonging to the current instruction queue, in which CSPM_ID and LSHM_ID need to be compared separately. When a conflict of one ID occurs, it is deemed to exist a conflict relation and all instruction positions existing the conflict relation are tagged 1.

For example, as illustrated in FIG. 3, the number of units of one-dimensional data, dimensions r0~r7, corresponding to RDMA instructions in the sync table corresponds to the number of 8 units in the Memory Sync ID Table of loading RDMA instructions in FIG. 2.

As illustrated in FIG. 3, the corresponding relationship of the RDMA instruction and the PEA_EXEC computing instruction is that the third and fourth bit instructions of the loading RDMA instruction depends on the $0^{th}$ bit instruction of the PEA_EXEC computing instruction.

For example, as illustrated in FIG. 3, the number of units of one-dimensional data, dimensions w0~w7, corresponding to WDMA data memory instructions in the sync table corresponds to the number of 8 units in the Memory Sync ID Table of WDMA data memory instructions in FIG. 2.

As illustrated in FIG. 3, the corresponding relationship of the WDMA data memory instruction and the PEA_EXEC computing instruction is that the 0th bit instruction of the WDMA data memory instruction depends on the first bit instruction of the PEA_EXEC computing instruction and the first bit instruction of the WDMA data memory instruction depends on the 0th bit, first bit and second bit instructions of the PEA_EXEC computing instruction.

The $0^{th}$ bit instruction of the PEA_EXEC computing instruction depends on the $0^{th}$ bit and first bit instructions of RDMA. The first bit instruction of the PEA_EXEC computing instruction depends on the second bit instruction of RDMA and the second bit instruction of the PEA_EXEC computing instruction depends on the $0^{th}$ bit, first bit, third bit and fourth bit of RDMA.

At step S105, each instruction in the plurality of to-be-run instructions is executed.

At this step, a corresponding instruction is executed based on dependency of each type of instructions along the second data dimension of the sync table; a number of the second data dimension of each instruction type corresponds to a number of instruction units in the instruction queue and the instruction sync control module may call other instruction parameters corresponding to each instruction in the instruction unit through the sync table while executing the corresponding instruction to execute each instruction in the plurality of to-be-run instructions.

For example, as illustrated in FIG. 3, the number of 8 units of the second data dimension of the RDMA data loading instruction is consistent with the number of 8 units of the loading RDMA queue in the instruction queues in FIG. 4. The number of 8 units of the second data dimension of the PEA_EXEC computing instruction is consistent with the number of 8 units of the computing PEA_EXEC queue in the instruction queues in FIG. 4. The number of 8 units of the second data dimensions of the WDMA data memory instruction is consistent with the number of 8 units of the storage WDMA queue in the instruction queues in FIG. 4.

For example, as illustrated in FIG. 3, the program is executed based on the B direction of the second data dimension, that is, the arrangement direction sequence of column B. For example, when the $0^{th}$ bit of the RDMA data loading instruction is executed, other relevant data of relevant calling instructions of the $0^{th}$ bit in the loading RDMA queue are called accordingly. When the first bit of the RDMA data loading instruction is executed, other relevant data of relevant calling instruction of the first bit in the loading RDMA queue are called accordingly. 0~7 bits are called sequentially.

As illustrated in FIG. 3, since the $0^{th}$ bit and the first bit of the RDMA instruction do not depend on any instruction, execution of the $0^{th}$ bit and the first bit of the RDMA is not limited by any instruction. After the $0^{th}$ bit of RDMA is executed, dependency of the $0^{th}$ bit and the second bit instructions of the PEA_EXEC computing instruction in the column corresponding to the $0^{th}$ bit of RDMA may be cancelled. After the first bit of the RDMA is executed, dependency of the $0^{th}$ bit and the second bit instructions of the PEA_EXEC computing instruction in the column corresponding to the first bit of RDMA may be cancelled. After the $0^{th}$ bit of RDMA is completed, the B0 column is updated, and then the first bit of RDMA is executed and the B1 column is updated.

In another implementation of the method for distributing instructions in the disclosure, the Memory Sync ID Table of each instruction type includes a Memory Sync ID Table of loading instructions, a Memory Sync ID Table of computing instructions and a Memory Sync ID Table of storage instructions.

There are three instruction queues configured. The instruction types are a loading instruction, a computing instruction and a storage instruction. A loading instruction queue corresponds to loading instructions, a computing instruction queue corresponds to computing instructions and a storage instruction queue corresponds to storage instructions.

In another implementation of the method for distributing instructions in the reconfigurable processor of the disclosure, the Memory Sync ID Table includes 8 storage units sequentially configured. A storage unit address is "0~7". A unit address of a start bit is "0".

The number of instruction units in the instruction queue is 8-bit. A unit address in the instruction queue is "0~7". A unit address of a start bit of an instruction unit is "0". The unit address in the instruction queue "0~7" corresponds to a unit address in the control queue "0~7". In another implementation of the method for distributing instructions in the disclosure, an instruction set includes: each instruction type including a loading instruction RDMA, a computing instruction EXEC and a storage instruction WDMA.

The one-hot encoding of the first memory identification field or the one-hot encoding of the second memory identification field includes: "0, 1, 2 . . . ".

The current first memory library number encoding of the loading instruction RDMA, the computing instruction EXEC and the storage instruction WDMA is "0, 1, 2 . . . " The current second memory library number encoding of the loading instruction RDMA, the computing instruction EXEC and the storage instruction WDMA is "0, 1, 2 . . . ".

In another implementation of the method for distributing instructions in the disclosure, the step S103 further includes: judging whether each instruction unit of the instruction queue is full or not; if yes, returning to this step until there is an idle instruction unit in the instruction queue; if no, executing step S104.

According to a second aspect of the disclosure, a system for distributing instructions in a reconfigurable processor is provided. The reconfigurable processor includes an instruction fetch module, an instruction sync control module and an instruction queue module. The instruction fetch module may distribute a plurality of to-be-run instructions to the instruction sync control module and the instruction queue module respectively.

The instruction sync control module controls execution of instructions in the instruction queue module. Types of to-be-run instructions are included in an instruction set. The instruction set includes a plurality of instruction types.

A plurality of instruction queues are configured in the instruction queue module. A plurality of instruction units are sequentially configured in each instruction queue. One instruction queue corresponds to one instruction type.

The system for distributing instructions in the reconfigurable processor includes a Memory Sync ID Table configuring unit, an instruction fetch unit, a one-hot encoding unit, a sync table generating unit and an instruction execution unit.

The Memory Sync ID Table configuring unit is configured to configure a format of a Memory Sync ID Table of each instruction type. The Memory Sync ID Table includes a plurality of storage units sequentially configured. A first memory identification field storage bit and/or a second memory identification field storage bit may be configured in each storage unit. Each instruction type corresponds to a set number of first memory identification fields and/or second memory identification fields.

The instruction fetch unit is configured to sequentially extract a first memory identification field and a second memory identification field of each instruction in the plurality of to-be-run instructions. The instruction type of each instruction may be included in the instruction set.

The one-hot encoding unit is configured to one-hot encoding of the first memory identification field and/or one-hot encoding of the second memory identification field of each instruction based on the first memory identification field and/or the second memory identification field corresponding to the instruction type of each instruction.

The one-hot encoding of the first memory identification field and the one-hot encoding of the second memory identification field of each instruction are stored in the corresponding Memory Sync ID Table based on an execution order of the plurality of to-be-run instructions. Other instruction parameters of each instruction in the plurality of to-be-run instructions are sent to each instruction unit of the corresponding instruction queue in the instruction queue module.

The sync table generating unit is configured to obtain, by the instruction sync control module, dependency identification information of any one instruction type and other two instruction types based on one-hot encoding of first memory identification fields and one-hot encoding of second memory identification fields of each instruction type in the Memory Sync ID Table; and generate a sync table along a first data dimension based on the dependency identification information. The sync table includes a first data dimension and a second data dimension converged with each other. The first data dimension of each instruction type corresponds to a storage bit number of the Memory Sync ID Table of each instruction type.

The instruction execution unit is configured to execute a corresponding instruction based on dependency of each type of instructions along the second data dimension of the sync table; a number of the second data dimension of each instruction type corresponding to a number of instruction units in the instruction queue; and call, by the instruction sync control module, the instruction parameter corresponding to each instruction in the instruction unit through the sync table while executing the corresponding instruction to execute each instruction in the plurality of to-be-run instructions.

In another implementation of the system for distributing instructions in the disclosure, the Memory Sync ID Table of each instruction type includes a Memory Sync ID Table of loading instructions, a Memory Sync ID Table of computing instructions and a Memory Sync ID Table of storage instructions.

There are three instruction queues configured. The instruction types are a loading instruction, a computing instruction and a storage instruction. A loading instruction queue corresponds to loading instructions, a computing instruction queue corresponds to computing instructions and a storage instruction queue corresponds to storage instructions.

In another implementation of the system for distributing instructions of the disclosure, the Memory Sync ID Table includes 8 storage units sequentially configured. A storage unit address is "0~7". A unit address of a start bit is "0".

The number of instruction units in the instruction queue is 8-bit. A unit address in the instruction queue is "0~7". A unit address of a start bit of an instruction unit is "0". The unit address in the instruction queue "0~7" corresponds to a unit address in the control queue "0~7".

In another implementation of the system for distributing instructions in the disclosure, an instruction set includes: each instruction type including a loading instruction RDMA, a computing instruction EXEC and a storage instruction WDMA.

The one-hot encoding of the first memory identification field or the one-hot encoding of the second memory identification field includes: "0, 1, 2 . . . ".

The current first memory library number encoding of the loading instruction RDMA, the computing instruction EXEC and the storage instruction WDMA is "0, 1, 2 . . . " The current second memory library number encoding of the loading instruction RDMA, the computing instruction EXEC and the storage instruction WDMA is "0, 1, 2 . . . ".

In another implementation of the system for distributing instructions in the disclosure, the one-hot encoding unit is further configured to judge whether each instruction unit of the instruction queue is full or not; if yes, return to this unit until there is an idle instruction unit in the instruction queue. If no, execute the sync table generating unit.

In another implementation of the method for distributing instructions in a reconfigurable processor in the disclosure, it may be as follows.

Figure 6:
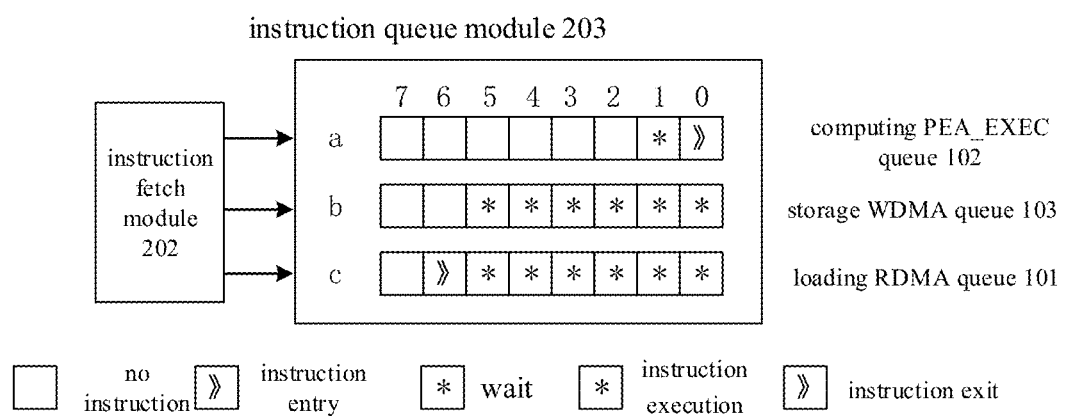
FIG. 6 is a schematic diagram illustrating multiple states of an instruction queue module in some embodiments of the disclosure.

As illustrated in FIG. 6, the depth of three instruction queues in the instruction queue module 203 is 8. The instructions in each instruction queue may have five states: no instruction, instruction entry, wait, instruction execution, instruction exit. The instruction states in the queue may refer to FIG. 6. Several descriptions for example cases as follows.

2.1. Within a queue, instructions are executed strictly in the entry order.
2.2. Each queue may have one instruction in an execution state and if there is the instruction that is in the execution state, the instruction must be located at a 0 address of the queue, such as instruction b0, instruction c0.
2.3. Instructions of different queues may be executed in parallel, such as instruction b0 and instruction c0.
2.4. For each queue, there may be no instructions in the execution state and all instructions in a wait state; (the reason may be that the instruction located at the 0 address in the queue needs to wait for instructions of other queues to complete execution and the sync control between such queues is implemented by the instruction sync control module 201).
2.5. When the queue is still in the idle position, the fetch module may send the instruction to the queue, such as instruction c6.
2.6. If a queue is full and the next fetched instruction still belongs to the queue, it needs to wait for the queue to have a vacancy for the instruction entry and the fetch module suspends the fetch and blocks the fetches of all subsequent instructions.
2.7. When the instruction in the execution state receives a done signal of the corresponding module, the instruction in the execution may be completed and exited, such as instruction a0.
2.8. In 3 queues, only one instruction is allowed in an exit state or one instruction is in an entry state at the same time. If a conflict occurs, an instruction exits preferentially; (an instruction entry state and an instruction exit state occurring simultaneously in the instruction queue in FIG. 6, are only two schematic states and such situation is not allowed in the actual circuit).

RDMA moves data from the outside to A region of the internal memory. The data in the A region of the memory are read by PEA_EXEC for computing and are then stored in a B region after computation. WDMA moves the data from the B region to the outside. As can be seen, the dependency among instructions, in essence, is a conflict relationship for accessing the same storage space.

A synchronization mechanism based on the memory bank ID is adopted in the disclosure.

Each instruction needing to access the memory contains ID information of the accessed memory bank and the instruction sync control module establishes a dependency among all instructions entering queues based on this information, to ensure that the instructions are issued in the correct sequence for executing.

Two memories CSPM and Local Shram are configured. There are 2 physical banks in CSPM and 32 physical banks in Local Shram. Then, the memory Bank ID may be divided in two classes as follows.

CSPM_ID (CSPM Bank ID, 1 bit), representing bank information of CSPM required by the instruction.

LSHM_ID (Local shram Bank ID, 5 bit): representing bank information of Local shram required by the instruction.

The memory bank ID in the instruction is only configured to establish a dependency on the execution order among instructions and does not completely correspond to partition of the physical banks of the memory. For example, if the previous instruction needs to occupy banks 0-2 of the local shram, it is represented by LSHM_ID=0 in the instruction and if the latter instruction needs to occupy a bank 2 of local shram, it may be considered to depend on the previous instruction and needs to be identified by LSHM_ID=0 in the instruction.

It is assumed that the number of the memory Bank IDs involved in each queue of instructions is sorted as shown in Table 1.

As illustrated in FIG. 2, based on the output of the instruction precoding module, one-hot encoding is performed on the CSPM_ID and the LSHM_ID of each instruction and the Memory Sync ID Table corresponding to the instruction queue is established. Therefore, when the instruction queue content changes (instruction entry or instruction exit), the Memory Sync ID Table needs to be updated correspondingly.

After the Memory Sync ID Table is established, conflict detection must be performed with all unexecuted instructions of the remaining two queues before each instruction enters the instruction queue (no detection needs to be performed with the queue the instruction belongs to since the queue is strictly executed in the entry order) to establish an instruction synchronization relationship. The instruction synchronization relationship is still represented by a table, defined as a Sync Table. The Sync Table is established based on the following steps.

All memory bank ID storage bits of the instruction are fetched, that is, CSPM_ID, LSHM_ID information.

One-hot encoding is performed on CSPM_ID and LSHM_ID information of the instruction and compared with the Memory Sync ID Tables of the remaining two queues not belonging to the queue of the instruction. CSPM_ID and LSHM_ID need to be compared independently. Only if a conflict of one ID occurs, it is deemed to exist a conflict relation and all instruction positions existing the conflict relation are tagged '1'.

After the previous steps is completed, 2 sets of 8-bit "01" sequences are generated and written in a corresponding position of the Sync Table. The sequences represent the conflict relationship between the instruction and instructions not in the same queue of all instruction queues. Only after all instructions corresponding to the position tagged as "1" are executed, the instruction may be issued.

FIG. 4 illustrates an example of an instruction and an instruction dependency in the instruction queue (represented in black arrows). It should be noted that, in an instruction dependency diagram, a part of dependency arrows that may be optimized are omitted, which may be represented in the explanation of the Sync Table as below.

(1) RDMA context, CSPM_ID=0
(2) RDMA data, LSHM_ID=0
(3) PEA_EXEC CSPM_ID=0, LSHM_ID=0, LSHM_ID=1
(4) RDMA context, CSPM_ID=1
(5) PEA_EXEC CSPM_ID=1, LSHM_ID=1, LSHM_ID=2
(6) WDMA data, LSHM_ID=2
(7) RDMA context, CSPM_ID=0
(8) RDMA data, LSHM_ID=0
(9) PEA_EXEC CSPM_ID=0, LSHM_ID=0, LSHM_ID=1
(10) WDMA data, LSHM_ID=1

As illustrated in FIG. 3, based on the above instruction example, it illustrates a presentation form of a dependency among each instruction in the Sync Table. It is illustrated as follows.

3.1. Each "√" represents a dependency between instructions at the horizontal and vertical coordinates of its position. Taking "√" of coordinates (PEA-2, RDMA-0) for an example, it represents that instruction PEA-2 relies on instruction RDMA-0, that is, PEA-2 may be issued after RDMA-0 is executed.

3.2. The instruction dependency allows one-to-many and many-to-one, for example, PEA-0 depends on RDMA-0 and RDMA-1 and WDMA-0 and WDMA-1 both rely on PEA-1.

3.3. The condition of allowing to issue instructions in the instruction queue is that the instruction is located at the read pointer position of the queue the instruction belongs to and does not depend on any instruction of other queues (no "√" in the corresponding row of the Sync Table).

3.4. When an instruction enters a queue, the instruction Sync Table needs to be updated at the same time, except that the instruction queue needs to be updated. Assuming that the 10$^{th}$ instruction in the example enters the queue, a Sync Table needs to update a row of an A1 box in the dependency update diagram.

When an instruction exits a queue after execution, the instruction Sync Table needs to be updated at the same time, except that the instruction queue needs to be updated. Assuming that the second instruction completes execution in the example, the Sync Table needs to clear "√" in the column of a B1 box of the diagram to represent that all dependencies constrained by the instruction are removed.

It is to be understood that even though the specification is described according to each embodiment, not each embodiment only includes one independent technical solution. For the purpose of clarity only, those skilled in the art will appreciate that the specification is taken as a whole and technical solutions of each embodiment may be suitably combined to form other implementations that may be appreciated.

The detailed description set forth above is only a specific description for a feasible implementation of the disclosure and is not intended to limit the protection scope of the disclosure and that equivalent implementations or variations that do not depart from the spirit of the disclosure are intended to be included within the scope of the disclosure.

What is claimed is:

1. A method for distributing instructions in a reconfigurable processor, wherein the reconfigurable processor comprises a plurality of instruction queues; each instruction queue is provided with a plurality of instruction units sequentially arranged; each instruction queue corresponds to one instruction type; the method comprises:

step S101, configuring, by the reconfigurable processor, a Memory Sync ID Table of each instruction type; wherein each Memory Sync ID Table comprises a plurality of storage units sequentially configured; each storage unit comprises a first memory identification field storage bit and/or a second memory identification field storage bit; each instruction type corresponding to a set number of first memory identification fields and/or second memory identification fields;

step S102, sequentially, by the reconfigurable processor, extracting a first memory identification field and a second memory identification field of each instruction in a plurality of to-be-run instructions;

step S103, obtaining, by the reconfigurable processor, one-hot encoding of the first memory identification field and/or one-hot encoding of the second memory identification field of each instruction;

storing, by the reconfigurable processor, the one-hot encoding of the first memory identification field and the one-hot encoding of the second memory identification field of each instruction into a corresponding Memory Sync ID Table based on an execution order of the plurality of to-be-run instructions;

sending, by the reconfigurable processor, an instruction parameter of each instruction to a corresponding instruction unit of a corresponding instruction queue;

step S104, obtaining, by the reconfigurable processor, dependency identification information of any one instruction type and other two instruction types based on one-hot encoding of first memory identification fields and one-hot encoding of second memory identification fields of each instruction type in each Memory Sync ID Table; generating, by the reconfigurable processor, a sync table along a first data dimension based on the dependency identification information; the sync table comprising the first data dimension and a second data dimension converged with each other; the first data dimension of each instruction type corresponding to a storage bit number of each Memory Sync ID Table of each instruction type; and step S105, executing, by the reconfigurable processor, a corresponding instruction based on dependency of each type of instructions along the second data dimension of the sync table; a number of the second data dimension of each instruction type corresponding to a number of instruction units in a corresponding instruction queue; and calling, by the reconfigurable processor, the instruction parameter corresponding to each instruction in a corresponding instruction unit through the sync table while executing each instruction in the plurality of to-be-run instructions.

2. The method of claim 1, wherein,
each instruction type comprises one of a loading instruction, a computing instruction and a storage instruction;
each Memory Sync ID Table comprises one of a Memory Sync ID Table of loading instructions, a Memory Sync ID Table of computing instructions and a Memory Sync ID Table of storage instructions; and
each instruction queue comprises one of a loading instruction queue corresponding to loading instructions, a computing instruction queue corresponding to computing instructions and a storage instruction queue corresponding to storage instructions.

3. The method of claim 1, wherein, each Memory Sync ID Table comprises 8 storage units configured in sequence; and each instruction queue comprises 8 instruction units.

4. The method of claim 3, wherein,
each storage unit of the Memory Sync ID Table of loading instructions comprises a first memory identification field and a second memory identification field;
each storage unit of the Memory Sync ID Table of computing instructions comprises a first memory identification field and a second memory identification field; and
each storage unit of the Memory Sync ID Table of storage instructions comprises a second memory identification field.

5. The method of claim 1, wherein, the step S103 further comprises:
judging whether each instruction unit of each instruction queue is full or not;
in response to that each instruction unit of each instruction queue is full, returning to the step of judging whether each instruction unit of each instruction queue is full or not until there is an idle instruction unit in each instruction queue; and
in response to that each instruction unit of each instruction queue is not full, executing step S104.

6. A system comprising:
a reconfigurable processor, wherein the reconfigurable processor comprises a plurality of instruction queues; each instruction queue is provided with a plurality of instruction units sequentially arranged; each instruction queue corresponds to one instruction type; and
a memory for storing instructions executable by the reconfigurable processor, wherein the reconfigurable processor is configured to:
configure a Memory Sync ID Table of each instruction type; wherein each Memory Sync ID Table comprises a plurality of storage units sequentially configured; each storage unit comprises a first memory identification field storage bit and/or a second memory identification field storage bit; each instruction type corresponding to a set number of first memory identification fields and/or second memory identification fields;
sequentially extract a first memory identification field and a second memory identification field of each instruction in a plurality of to-be-run instructions;
obtain one-hot encoding of the first memory identification field and/or one-hot encoding of the second memory identification field of each instruction;
store the one-hot encoding of the first memory identification field and the one-hot encoding of the second memory identification field of each instruction into a corresponding Memory Sync ID Table based on an execution order of the plurality of to-be-run instructions; and
send an instruction parameter of each instruction to a corresponding instruction unit of a corresponding instruction queue;
dependency identification information of any one instruction type and other two instruction types based on one-hot encoding of first memory identification fields and one-hot encoding of second memory identification fields of each instruction type in each Memory Sync ID Table; and generate a sync table along a first data dimension based on the dependency identification information; the sync table comprising the first data dimension and a second data dimension converged with each other; the first data dimension of each instruction type corresponding to a storage bit number of each Memory Sync ID Table of each instruction type; and
execute a corresponding instruction based on dependency of each type of instructions along the second data dimension of the sync table; a number of the second data dimension of each instruction type corresponding to a number of instruction units in a corresponding instruction queue; and call, by the instruction sync control module, the instruction parameter corresponding to each instruction in a corresponding instruction unit through the sync table while executing each instruction in the plurality of to-be-run instructions.

7. The system of claim 6, wherein,
each instruction type comprises one of a loading instruction, a computing instruction and a storage instruction;
each Memory Sync ID Table comprises one of a Memory Sync ID Table of loading instructions, a Memory Sync ID Table of computing instructions and a Memory Sync ID Table of storage instructions; and
each instruction queue comprises one of a loading instruction queue corresponding to loading instructions, a computing instruction queue corresponding to computing instructions and a storage instruction queue corresponding to storage instructions.

8. The system of claim 6, wherein, each Memory Sync ID Table comprises 8 storage units sequentially configured; and each instruction queue comprises 8 instruction units.

9. The system of claim 8, wherein,
each storage unit of the Memory Sync ID Table of loading instructions comprises a first memory identification field and a second memory identification field;
each storage unit of the Memory Sync ID Table of computing instructions comprises a first memory identification field and a second memory identification field; and
each storage unit of the Memory Sync ID Table of storage instructions comprises a second memory identification field.

10. The system of claim 6, wherein, the reconfigurable processor is configured to:
judge whether each instruction unit of each instruction queue is full or not;
in response to that each instruction unit of each instruction queue is full, return to judge whether each instruction unit of each instruction queue is full or not until there is an idle instruction unit in each instruction queue; and
in response to that each instruction unit of each instruction queue is not full, obtain dependency identification information.

* * * * *